Feb. 18, 1958  A. COX ET AL  2,823,612
TARGET SEEKER HEAD FOR GUIDED MISSILES
Filed Aug. 20, 1953
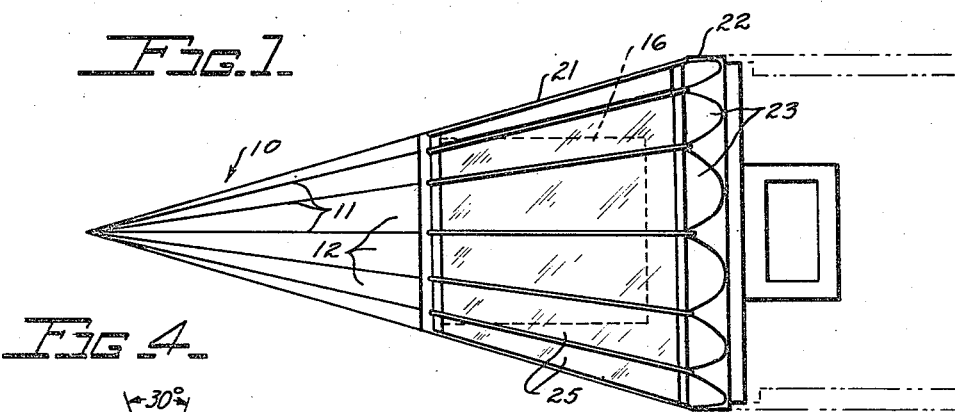
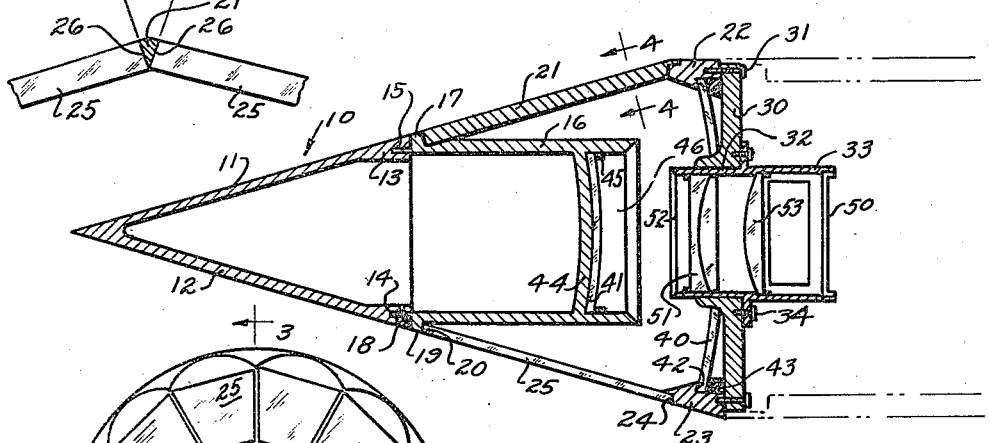
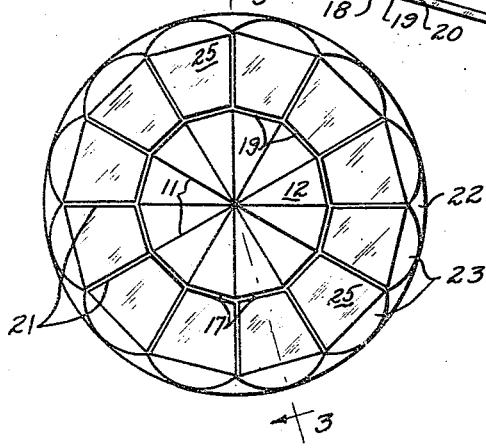
INVENTORS.
ARTHUR COX.
CATHERINE LEDDA
BY
ATTORNEYS

United States Patent Office 2,823,612
Patented Feb. 18, 1958

2,823,612

TARGET SEEKER HEAD FOR GUIDED MISSILES

Arthur Cox, Park Ridge, Ill., and Catherine Ledda, New York, N. Y., assignors to the United States of America as represented by the Secretary of the Air Force Application August 20, 1953, Serial No. 379,483

6 Claims. (Cl. 102—50)

This invention relates to target seeking heads for guided missiles and more particularly for supersonic missiles with an optical system included therein for transmitting light rays of a target to a focus on a focal plane for the control mechanism of the missile.

The preferred form of the seeker head is pyramidal in exterior shape with a plurality of sides, the forward or leading end thereof being opaque and the rearward end thereof having windows of plane parallel glass plates. Supported on the base of the pyramidal seeker head and facing toward the front or leading end of the head is an annular concave mirror which reflects light rays entering through the windows from an objective field substantially parallel to the axis of the pyramidal head to a convex concentrically supported mirror. The latter mirror reflects the light rays through a barrel concentrically of the base and the annular concave mirror which barrel supports a color correcting lens and a field flattening lens. The convex reflecting mirror and the barrel each have baffles to prevent direct light rays from striking the convex reflecting surface or the top surface of the color correcting lens. The plane parallel glass plates are joined at their longitudinal edges to thin metal stringers as by cementing, or the like. The longitudinal edges of the glass plates are silvered or otherwise made reflecting surfaces to eliminate the intensity variation around the image field when the head is operatively mounted on a missile headed for a uniformly illuminated area. It is therefore a general object of this invention to provide a supersonic missile target seeker head of pyramidal external configuration having flat glass windows on each of the sides in a zonal area near the base through which light rays may pass to be reflected on an annular concave mirror thence reflected on a light baffled concentric convex mirror through light baffled color-correcting and field flattening lenses to a focal plane from which missile control guiding signals are taken, the longitudinal edges of the flat glass windows being highly reflective to present a uniform intensity on the image focal plane from a uniformly illuminated object.

Other advantages, objects, features, and uses will become more apparent as the description proceeds when taken in view of the accompanying drawing, in which:

Fig. 1 is a side elevational view of the target seeker head;

Fig. 2 is a head-on elevational view of the target seeker head shown in Fig. 1;

Fig. 3 is a longitudinal sectional view of the target seeker head taken on the line 3—3 of Fig. 2; and Fig. 4 is a fragmentary view shown in cross-section taken on the line 4—4 of Fig. 3.

Referring now to all the figures, 10 is a pyramidal leading end or nose piece of hollow light-weight metal or other suitable material providing a plurality of external corners 11 and sides 12. The base of the nose piece 10 is thickened at 13 and has an inwardly extending annular groove 14 therein receiving an annular tongue portion 15 of a cylindrical support 16. The nose piece 10 and the cylindrical support 16 are retained together by screws 18, or by any other well known and suitable means. The cylindrical support 16 has an outwardly extending flange 17 adjacent the tongue portion which is flattened peripherally thereof in coextending planes 19 of the sides 12 of the nose piece 10. The flange 17 is channeled at 20 along each of its sides or planes 19 which channels are each perpendicular to the corresponding plane 19 for receiving the end of glass plates later to be described. At each of the corners 11 extended on the flange 17 is fixed a stringer 21, securely fastened in any suitable manner (not shown), which stringers all extend rearwardly and outwardly each in alignment with its corresponding corner 11. The rearward ends of stringers 21 are each securely fastened to a base ring 22. The base ring 22 has flattened portions 23 between the stringers 21 with a channel 24 on the forward edge of each flattened portion 23 having the side of each perpendicular to the related flattened portion 23 to receive the end of a glass plate.

Glass plates 25 are fixed in each opening established by the end channels 20, 24 and the stringers 21 as by cementing or other suitable means. It is preferable that each glass plate 25 have its longitudinal side edges 26 silvered or otherwise made highly reflective for reasons later to be described. The ends and the side edges 26 are all made normal to the face sides of the glass plates and consequently the angle of the stringers between the glass plates is determined by the number of sides of the target seeker head. By way of illustration in the drawing the target seeker head is shown to have twelve sides and therefore twelve glass plate windows which would require the stringers to each have a cross-sectional angle of 30 degrees, as best realized in Fig. 4. The stringers 21 are for all practical purposes kept as thin as possible yet of sufficient strength to function as the framework of the target seeker head, therefore the stringers are made with a cross-sectional shape of sectors of a circle.

Attached to the base ring 22 is a base plate 30 as by marginal screws 31. The base plate 30 has a central opening 32 therein in which opening is supported a lens barrel 33 in any suitable manner as by cap screws 34, or the like. The diameter of the base plate 30 is slightly less than the diameter of the base ring 22 to provide a circumferential shelf over which the body of a missile may be slipped and secured in any well known manner as shown in phantom lines. Since the missile body and the components therein form no part of this invention and are not necessary to the explanation of this invention, further description thereof will not be given herein.

Light rays entering through the glass window plates 25 are reflected by a Cassegrainian type of reflecting system through the barrel 33 to a focal plane for scanning pickup in the missile control mechanism. The Cassegrainian type of reflecting system consists of an annular primary concave mirror 40 and a secondary convex mirror 41. The primary concave annular mirror 40 is illustrated as being supported against a shoulder 42 in the base ring 22 by the base plate 30 with resilient pads 43 therebetween, although many ways of supporting this mirror may be utilized as desired. The primary annular concave mirror 40 is preferably of the Mangin glass type having spherical surfaces in which the back surface is silvered. The secondary convex mirror 41 is supported in the rearward end of the cylindrical support 16 in any suitable manner but illustrated in the drawing as resting on a partition 44 flexed to the cylindrical support 16 and retained by a ring 45. The secondary concave mirror 41 is positioned inwardly of the rearward end of the cylindrical support 16 sufficiently to allow the rearward end of the cylindrical support to provide a light baffle 46 to prevent light rays passing through the windows 25 from directly impinging the secondary convex mirror 41. The outer surface of the cylindrical support 16, as well as all other nonreflecting surfaces including the barrel 33 within the target seeker head, is made a flat or dead black to prevent reflections. The secondary convex mirror 41 is also preferably of the the Mangin glass type having spherical surfaces with the back surface thereof silvered. While specific types of Mangin mirrors utilizing aspherical surfaces may be used for the mirrors 40 and 41 to correct spherical aberrations, such special mirrors offer no advantage or improvement to the optical system of this device.

The reflected ray from the secondary convex mirror 41 is directed through the barrel 33 to a focal plane 50, which may be a ground glass plate or may be the end of a tube pickup in the missile control system, where an image is formed of an object forward of the target seeker head. With the Cassegrainian type reflecting system described the target seeker head has a field of view of about 20 degrees about the longitudinal centerline forward of the seeker head. To improve the image a color-correcting doublet 51 is placed in the lens barrel 33 near the forward end thereof, the forward end of the barrel 33 operating as a light baffle 52 against light rays coming directly through the glass plates 25 and striking the first surface of the doublet 51. Behind the doublet 51 is a field flattening lens 53 to improve image formation on the flat focal plane 50. The surfaces about the mirrors and lenses are all of dead black to minimize or eliminate stray light reflections as is the general practice in such light transmission systems.

In the operation of the target seeker head when positioned on a missile body, the image of any object in about a 20 degree cone of view in front of the target seeker head will appear on the focal plane 50 for scanning by the missile control system. Light rays entering from in front of the nose piece 10 pass through the glass plates 25 and are reflected on the primary annular concave mirror 40 to the secondary convex mirror 41 where they are reflected through the color-correcting doublet 51 and the field flattener 53 to the focal plane 50. The light baffles 46 and 52 prevent direct rays of light coming through the windows 25 from striking the secondary mirror 41 and the lens doublet 51 but allow the light rays from the primary concave annular mirror 40 to pass freely to the secondary convex mirror 41. The stringers 21 ordinarily would cause a variation in light intensity around the image field even when the target seeker head is directed toward a uniformly illuminated object and such a variation would result in spurious signals being fed to the control mechanism of the missile. The shadow effect of the stringers 21 is substantially eliminated by silvering the longitudinal side edges of each of the glass plates 25. Light transmitted from the terminal edge of the conical forward field of view will be reflected from the silvered edge of one of the plates 25 on one side of a stringer 21 with an angle of reflection equal to the angle of incidence. The reflected light will pass through into the optical system as if it came from the opposite boundary edge of the field of view. The reflecting edge of the adjacent plate 25 on the opposite side of the stringer will have a similar effect except that the reflected light will appear to come from the opposite side of the field of view. Thus nearly all of the light which would be intercepted by the stringers when the missile head is exposed to a uniformly illuminated forward field of view is transmitted into the optical system to eliminate discontinuities or shadow effects in the optical image formed in the optical system. This eliminates the possibility of a spurious signal arising when no target is in the field of view. The color-correcting doublet corrects the chromatic aberrations caused by the dispersion of the color in the light rays through glass surfaces. The field flattener lens 53 merely flattens the image on the flat focal plane. A clear sharp image on the focal plane 50 with good contrast provides a scanner missile control system with the means to guide the missile to its target. The color-correcting doublet and the field flattener could be eliminated, or the ordinary mirrors could be used instead of the Mangin mirrors, without destroying the operation of the device but the efficiency and effectiveness would be impaired.

While many modifications and changes may be made in the constructional details and features of this invention it is to be understood that the invention is illustrated only and many such modifications and changes may be made without departing from the spirit and scope of this invention and we desire to be limited only in the scope of the appended claims.

We claim:

1. A target seeker head for guided missiles adaptable to be attached to the missile body comprising; a pyramidal-shaped body having a plurality of sides with flat glass plate windows separated by narrow stringers circumferentially adjacent the base thereof; a primary concave annular glass mirror having the back surface thereof coated with a reflecting material; a secondary convex glass mirror having the back surface thereof coated with a reflecting material, said primary and secondary mirrors facing each other with the primary mirror facing the vertex of the body through said glass plate windows whereby light rays entering through the glass plate windows from in front of said body will be focused on a plane through the central opening of said primary annular concave glass mirror for the use of the control mechanism of a missile.

2. In a target seeker head as set forth in claim 1 wherein the edges of said glass plates paralleling the longitudinal centerline through said seeker body are coated with a reflecting material to produce a uniform light intensity in the focal plane when the seeker head is directed toward a uniformly illuminated object.

3. An optical system for a target seeker head adapted to be mounted on the nose of a supersonic missile comprising a conical body having a plurality of transparent windows adjacent the base of the body and extending circumferentially therearound, said windows being plane surfaces lying in the exterior lateral surface of the body, said windows having a circumferential forward angular field of view of the order of twenty degrees, a Cassegrainian optical system within said body including an annular concave mirror adapted to receive light from the forward field of view of said transparent windows, a convex reflector positioned forward of said annular mirror and adapted to receive light reflected therefrom and to transmit light along an optical axis concentric with said annular concave mirror, and means positioned along said optical axis for correcting for refraction and color dispersion caused by light from the forward field of view passing through said inclined transparent windows and baffle means associated with said convex mirror and said color correcting means preventing light from other than said forward field of view from entering the optical system.

4. The structure as claimed in claim 3, in which the missile head body includes a nose portion and a base portion spaced from the nose portion, symmetrically disposed structural stringer members interconnecting said nose and base portions and lying in the lateral surface of the body, said transparent plane windows being supported between said stringer members and the longitudinal edges of said window members being coated with a reflective coating so as to reflect light into the optical system which would be intercepted by the stringer members.

5. An optical system for a target seeker head for supersonic missiles, said head adapted to form the streamlined nose of the missile, said head being in the form of a multisided pyramid having a nose portion and a base portion spaced from said nose portion and structural stringer members lying in the edges of the pyramidal sides supporting said nose portion from the base portion, the optical system for said head including thin transparent windows positioned in the openings between said stringer members and forming continuations of the pyramidal sides extending from the nose to the base portions, an annular concave mirror positioned in said seeker head adjacent said base portion and concentric therewith and adapted to receive light from a forward field of view extending in the order of twenty degrees, a convex mirror positioned within said head adapted to receive the light transmitted from said annular concave mirror and transmit light along the optical axis of the head and a correcting lens system receiving light transmitted from said convex mirror and correcting for refraction and color dispersion caused by transmission of light from the field of view through said transparent windows and light baffles within said head for obstructing light from other than the field of view from entering the optical system.

6. The structure as claimed in claim 5, in which the longitudinal edges of the transparent windows are silvered such that light from a uniform illuminated forward field will be transmitted through said seeker head optical system substantially free from any shadow effect caused by the presence of the stringer members within the optical field of view.

References Cited in the file of this patent

UNITED STATES PATENTS

| | | |
|---|---|---|
| 2,153,709 | Bournisien | Apr. 11, 1939 |
| 2,415,348 | Haigney | Feb. 4, 1947 |
| 2,424,193 | Rost et al. | July 15, 1947 |

FOREIGN PATENTS

| | | |
|---|---|---|
| 352,035 | Great Britain | June 22, 1931 |

OTHER REFERENCES

Article by Albert G. Ingals, published in Scientific American, issue of December 1947, pgs. 283 to 286.